Dec. 18, 1928.
B. A. PROCTOR
1,695,857
FILM REVERSING MECHANISM
Filed July 25, 1925    4 Sheets-Sheet 1
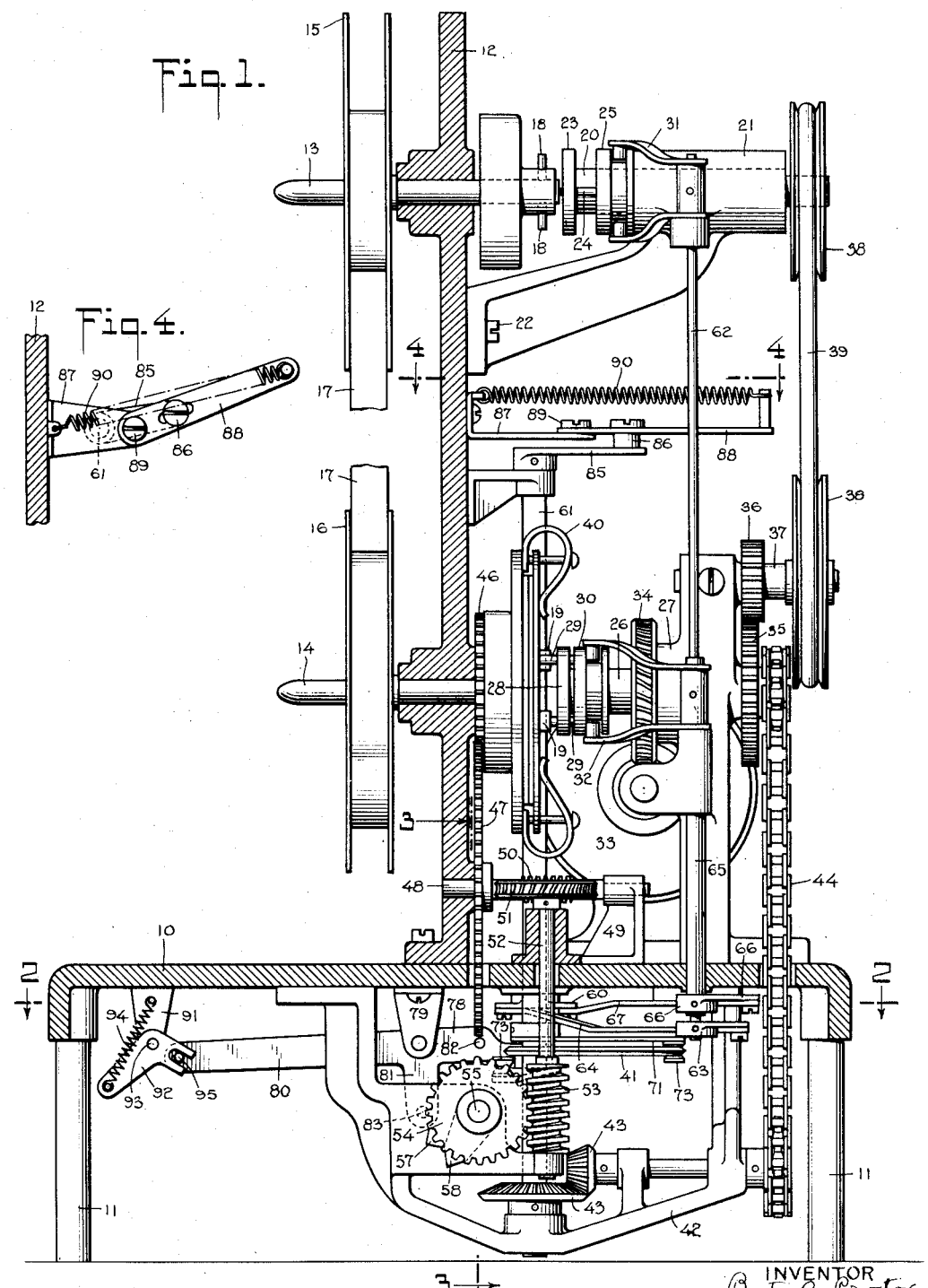
INVENTOR
Barton A. Proctor
BY William S. Gluck
ATTORNEY Dec. 18, 1928.
B. A. PROCTOR
1,695,857
FILM REVERSING MECHANISM
Filed July 25, 1925
4 Sheets-Sheet 2
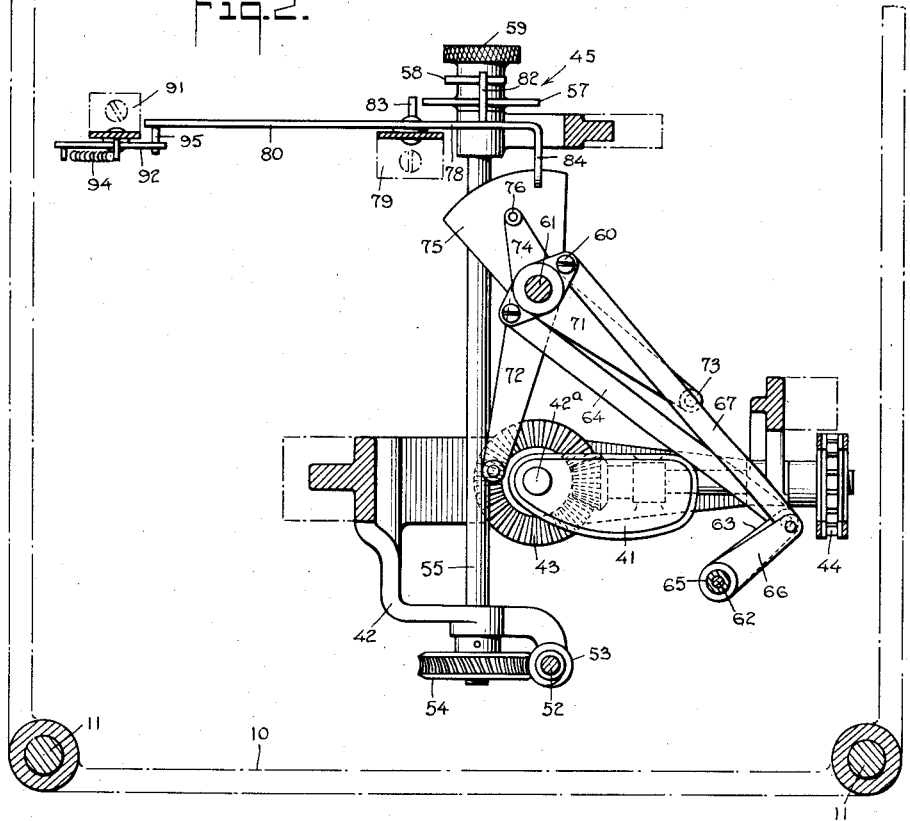
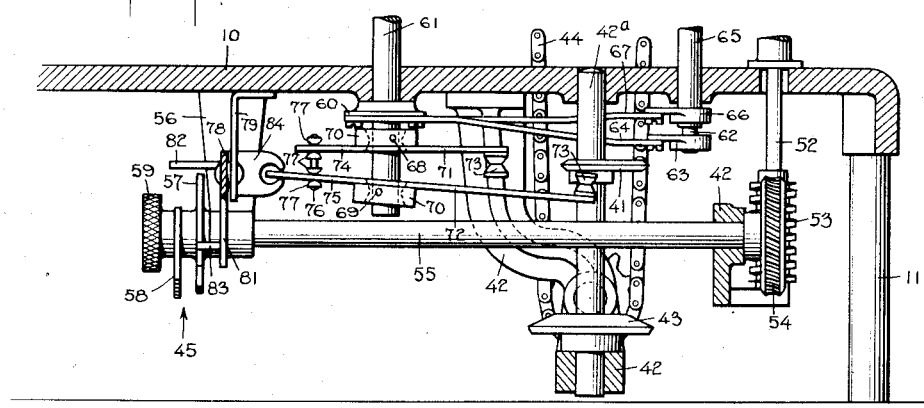
INVENTOR
Barton A. Proctor
BY
William S. Gluck
ATTORNEY

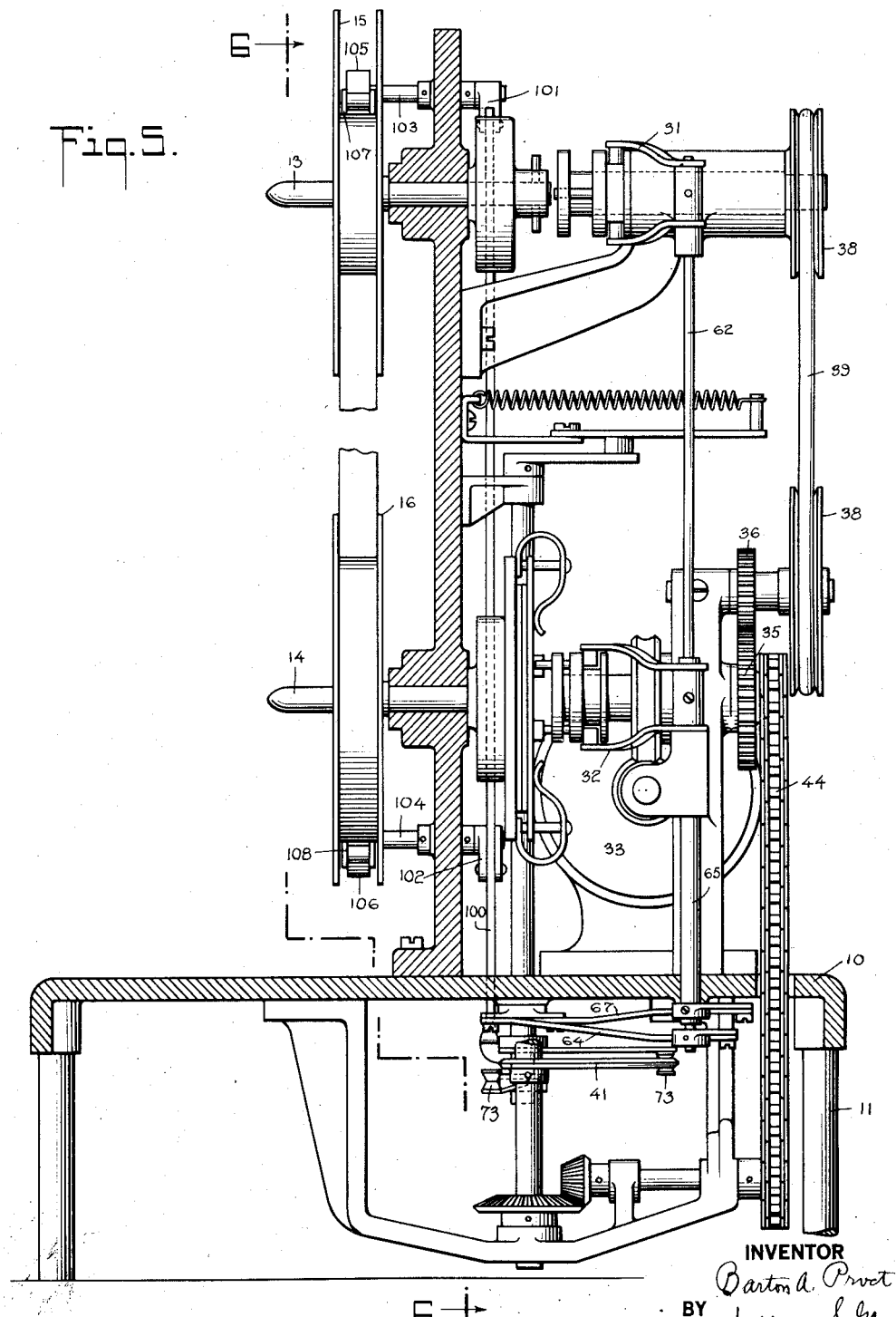

Dec. 18, 1928.
B. A. PROCTOR
1,695,857
FILM REVERSING MECHANISM
Filed July 25, 1925     4 Sheets-Sheet 4
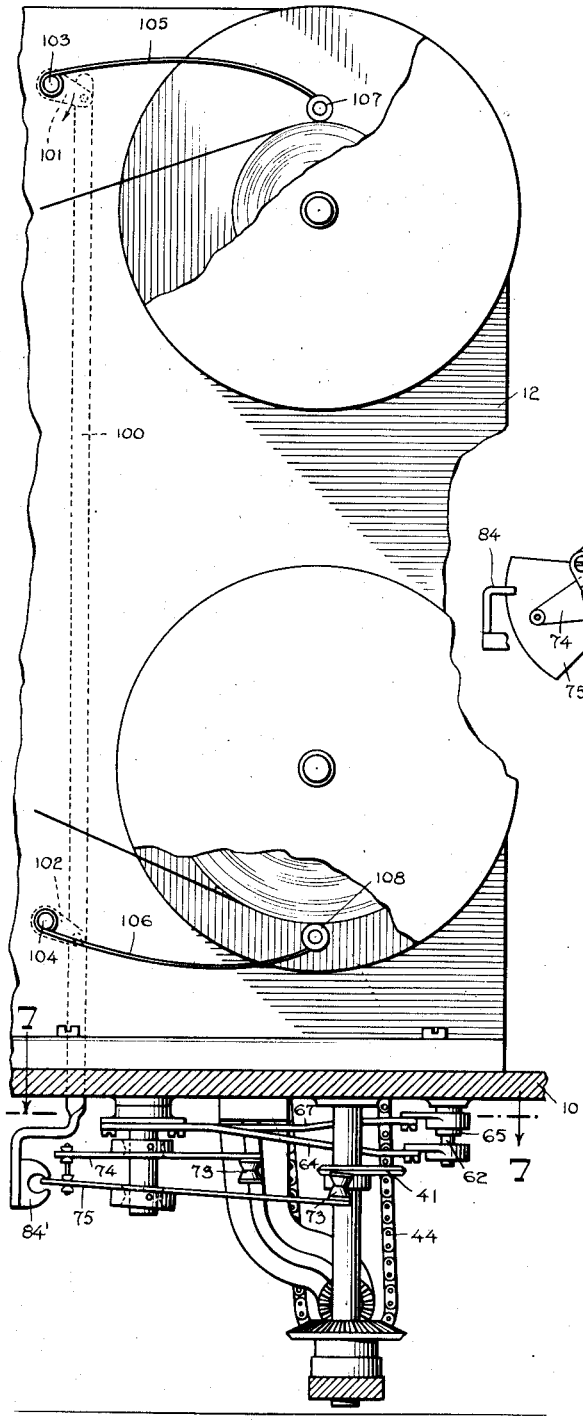
INVENTOR
Barton A. Proctor
BY
William S. Gluck
ATTORNEY Patented Dec. 18, 1928.

1,695,857

UNITED STATES PATENT OFFICE.

BARTON A. PROCTOR, OF NEW YORK, N. Y., ASSIGNOR, BY MESNE ASSIGNMENTS, TO THE AUTOMATIC ADVERTISER, INCORPORATED, OF NEW YORK, N. Y., A CORPORATION OF DELAWARE.

FILM-REVERSING MECHANISM.

Application filed July 25, 1925. Serial No. 45,963.

My invention relates to controlling mechanism, and more particularly to mechanism capable of association with film reel winding apparatus causing a reversal of movement of the film.

In film reel winding mechanism in general, and in particular in that type adapted for advertising display purposes, it is desirable to associate with the means for winding the film reel in one direction means for automatically reversing the direction of winding at a predetermined point or time so as to cause a rewinding of the film at a comparatively rapid rate of speed.

One of the objects of my invention is the provision of means for automatically reversing the direction of movement of the film after each winding operation has been completed and then again thereafter reversing the direction of its movement whereby the mechanism once started will cause the entire film reel to be displayed and rewound time after time without further attention.

Another object of my invention lies in providing such mechanism with adjustable means for causing the reversal at any desired predetermined point or for compensating for variation in the lengths of films.

A further object of the invention lies in providing reversing mechanism which may be used in association with film winding and rewinding mechanism embodying driving means constantly moving in one direction, whereby the possible utilization of an electric motor for driving purposes will permit the device to function without necessitating a reversal of the motor.

An object of the invention is to provide reversing mechanism adapted for use generally in association with any mechanism embodying relatively movable elements, such as spindles or shafts, wherein alternate reversals of their movements are necessary or desired.

A further object of my invention lies in providing mechanism of this character which is of staunch construction, positive and reliable in operation, and inexpensive to manufacture, embodying elements of relatively simple construction, cooperating in a manner rendering defective operation improbable, and easily accessible for purposes of assembly, repair, or adjustment.

In the reversing of the direction of the movement of the film, the particular time or point at which the reversal is effected, need not be definite because of the fact that any small variations in such point of reversal will not be particularly noticeable and furthermore, can be provided for by an extra length of film within any portion of which, the reversal can be effected. In fact, a slight variation in the point at which the reversal of movement of the film is effected is desirable particularly in the type of machine where the film is positively engaged as by teeth of the sprocket wheel, because where such teeth are caused to reverse their direction of movement always when in engagement with the same opening or openings in the film strip, the moment of inertia present when the reversal takes place will always be carried by the same openings so that such openings will be subject to excessive wear. The timing of the reversal can be controlled by a member, the character of the construction or of the operation of which is such as to permit of a variation in the point at which it effectuates the timing. For this reason, the timing can be effectuated either by a member which has a relatively slow movement or by a member such as a cam, the operation of which is gradual. On the other hand, I find that the actual reversal in the direction of the movement of the film must be effectuated quickly.

One of the objects of my invention is the provision of an arrangement for reversing the movement of the film which permits of a variation in the time at which the reversal is effected, but provides for the effectuation within a relatively short time.

According to one feature of the invention, I provide, briefly, actuating means comprising primary actuating means for effecting the reversal, and secondary actuating means for controlling the time at which such reversal is effected.

In a preferred embodiment, the primary actuating means comprises means moving relatively rapidly and the secondary actuating means comprises a member driven at a comparatively slower rate of speed and cooperating with the first for controlling the time of its operation. The primary actuating means may comprise a member constantly driven by the main source of driving energy, whereas the secondary actuating means may be driven by one of the film reels.

According to another feature of the invention, the second-mentioned actuating means is adjustable in accordance with the length of the film reel, whereby adjustment thereof will cause a reversal of the direction of winding at proper or predetermined intervals of time when the reel has been completely wound or rewound.

According to another feature of the invention I provide control means for proximately causing and effecting the reversal, arranged and designed to be actuated by said actuating means.

In a preferred embodiment, the control means comprises mechanism capable of oscillatory movement between two positions, and operatively connected with the mechanism to be reversed so as to cause movement of the latter in one direction when the oscillatable mechanism is in one of said positions, and to cause reverse movement when in the other of said positions. The actuating mechanism cooperates with the control means at predetermined intervals of time for moving the control means from one to the other of said positions.

In a preferred embodiment, the control means comprises an oscillatable member operatively connected at its ends with the mechanism to be reversed, and provided with elements oscillatable with said member and movable also into and out of cooperation with the actuating means. The primary actuating means preferably comprises a constantly rotating cam, normally inoperative, but effecting a movement of the control means when one of the elements is moved into engagement therewith. The secondary actuating means comprises preferably a second rotatable cam cooperating with said elements at predetermined intervals of time for moving them successively into such engagement.

According to another feature of the invention, the primary cam is constantly rotated in one direction, and the secondary cam is rotated at a greatly reduced rate of speed in one or the other direction according to the direction of movement of the mechanism, such as film reels, which is the subject of the reversal. The second cam is so designed and arranged that rotation in either direction never exceeds 360°, and is in general less than 240°.

In a preferred embodiment the elements movable with the oscillatable member comprise two arms mounted at an angle to one another in superposed planes and designed to be oscillatable with the member and pivotally mounted with respect thereto so that one or the other of said arms may be brought into a plane between them coincident with the plane of rotation of the primary cam. A pivotally mounted member, such as a lever, is operatively interposed between the secondary cam and the two arms, and is preferably provided with pins adapted to be encountered by the secondary cam to effect pivotal movement of the lever, and provided also with a jaw adapted to engage said arms to produce a pivotal movement thereof to cause one of them to move into engagement with the primary cam.

According to another feature of the invention, spring means are provided in association with the oscillatable member constituting part of the control means, and with the pivotal lever last referred to, and cooperating with said member and lever respectively to produce quick and positive movements thereof immediately after such movement has been barely initiated.

While in this application, I have illustrated and described my mechanism as associated with a film moving apparatus for a moving picture machine for purposes of reversing the direction of movement of the film, it will be understood that my invention has a broader field of utility and that certain phases of the invention are capable of employment with other types of apparatus and that unless otherwise set forth in the claims, the invention is to be given its broader interpretation.

For the attainment of these foregoing objects and such other objects as may hereafter appear or be pointed out, I have illustrated embodiments of my invention in the accompanying drawings, in which Fig. 1 is an elevation, partly in section, showing my mechanism in association with a film reel winding and rewinding mechanism;

Fig. 2 is a plan view, in section, taken along the line 2—2 of Fig. 1;

Fig. 3 is a side elevation of the reversing mechanism proper, in section, taken along the line 3—3 of Fig. 1; and Fig. 4 is a plan view of one of the spring means, taken along the line 4—4 of Fig. 1.

Fig. 5 is an elevational view similar to Fig. 1, showing a modification.

Fig. 6 is a side view partly in section taken on line 6—6 of Fig. 5; and

Fig. 7 is a section taken on line 7—7 of Fig. 6.

Referring to Figures 1 to 4 of the drawings, and particularly to Fig. 1, I have shown a supporting structure or frame work which may consist of a base plate 10 provided with pedestals or feet 11 and carrying a superstructure or panel 12 in a manner whereby the reversing mechanism is contained within the space underneath the plate 10, and the winding and re-winding mechanism is positioned above the plate 10 and at one side of the panel 12. The latter is provided with suitable spaced bearings to receive the film reel spindles 13 and 14 carrying the reels 15 and 16 respectively in suitable relative positions whereby a film 17 may be wound from one reel on to the other depending upon the direction of rotation of the spindles 13 and 14. Suitable means such as a clutch, is associated with each reel whereby one thereof may be rendered operative and the other inoperative depending upon the relative engagement or disengagement of the clutches. By way of example I have shown the spindle 13 provided at its inner end with oppositely projecting transverse pins 18, and the corresponding end of the spindle 14 with lugs 19 similarly spaced for a similar purpose presently to be described. Coaxial with each spindle is a shaft carrying a clutch member splined thereto adapted to engage either the pins 18 or 19 to cause the spindles 13 or 14 to rotate with their coaxial shafts. I have shown a shaft 20 coaxially mounted with respect to the spindle 13 in a bearing 21 suitably supported, as at 22, by the panel 12. The forward end of the shaft 20 is provided with a flange 23 having axial bores to receive pins 24 carried by a clutch 25; movement of the clutch along the shaft 20 will project the pins 24 from the front face of the flanged end 23 to engage the pins 18, or will withdraw the pins 24 from engagement with the pins 18 to disconnect the spindle 13. I have shown a similar shaft 26 coaxially mounted with respect to the spindle 14 in a suitable bearing provided in a casting 27 supported upon the base 10, said shaft being provided with a flanged end 28 having bores to receive pins 29 carried by a clutch 30.

Each clutch is provided with an annular groove to receive yokes 31 and 32 which effect the movements of the clutches along their respective shafts.

The main driving means may comprise a motor 33 which is in constant operative connection with the shafts 20 and 26 to rotate them in opposite directions. In the illustrated embodiment, I have shown a worm and wheel engagement 34 between the motor 33 and the shaft 26. The rear end of the shaft 26 carries a spur gear 35 which meshes with a smaller spur gear 36 mounted on a shaft 37 journaled in the casting 27. The shafts 37 and 20 are provided with pulleys 38 aligned to receive a belt 39, whereby the rotation of the motor 33 is transmitted to the shaft 20. By virtue of the relative sizes of the gears 35 and 36, the shaft 20 will rotate at a relatively faster rate of speed than the shaft 26, for a purpose to be described.

It will be apparent from what has thus far been described that engagement of one of the clutches 25 or 30 and disengagement of the other thereof will cause one of the reels 15 or 16 to be operative and the other to be inoperative, so that in either case the film 17 will be wound from one reel on to the other. In the illustrated embodiment, the reel 16 constitutes the driving reel for movement of the film in a forward direction, and the reel 15 constitutes the rewinding reel. For this reason the shaft 20 is designed to rotate at a relatively greater rate of speed. Suitable mechanism, not shown, is associated with the driving reel 16 for effecting a step by step movement thereof in a well known manner; no such mechanism is associated with the reel 15, since the re-winding operation does not require step by step movement of the film. Suitable mechanism for compensating for the varying diameters of the wound film may be provided in a well known manner, but not being within the scope of my invention, I have indicated the position of this mechanism as associated with the reel 16, and indicated it broadly by the reference numeral 40.

My invention consists primarily in the means for effecting alternate movements of the clutches 25 and 30 at predetermined intervals of time, whereby one reel may be rendered operative and the other inoperative at the end of each winding or re-winding operation.

The primary actuating means comprises a cam 41 carried by a shaft 42ᵃ suitably journaled at one end in the base plate 10, and at the other end in a hanger 42 suitably supported beneath the plate 10. The cam 41 is constantly rotated in one direction by the main driving means 33 through the media of a beveled gear engagement 43 and a chain and sprocket engagement 44, one of the sprockets being mounted on the rear end of the shaft 26.

The secondary actuating means comprises a rotatable cam, indicated broadly by the reference numeral 45, (Figs. 2 and 3) and will be described in greater detail hereinafter. The cam 45 is operatively connected with one of the reels in a manner to be rotated thereby at a greatly reduced rate of speed. In the illustrated embodiment, I have shown a spur gear 46 carried by the spindle 14 and meshing with a relatively larger spur gear 47 carried by a jack shaft 48 suitably journaled in the panel 12 and a casting 49 supported by the plate 10. The shaft 48 carries a worm 50 which meshes with a worm wheel 51 carried at the upper end of a vertical shaft 52 extending downward into the space beneath the plate 10. At its lower end, the shaft 52 carries a worm 53 which meshes with a worm wheel 54 carried at the end of a horizontal shaft 55 suitably journaled in a portion of the hanger 42 and in a casting 56 carried beneath the plate 10. The cam 45 is carried at the end of the shaft 55, and comprises a fixed cam element 57, that is, one which is rigidly mounted to rotate with the shaft 55, and an adjustable cam element 58 which consists of a strip loosely mounted on the shaft 55 and adjustable in any angular position by means of a knurled nut 59. In this manner, the time control can be varied so as to accommodate different lengths of film. The step-down gear between the spindle 14 and the cam 45 is so designed that the latter will never rotate more than 360° during one winding operation, and will in fact seldom rotate in any one direction for more than about 240°.

I shall now describe the control means which are the proximate cause of the reversal of the clutches 25 and 30, said control means being arranged to be actuated at predetermined intervals of time by the actuating means just described.

An oscillatable member 60 is mounted upon a shaft 61 suitably journaled in the base plate 10. The ends of the member 60 are operatively connected with the clutches 25 and 30 in a manner whereby oscillation of the member 60 will engage one clutch and disengage the other, or vice-versa. I have shown the yoke 31 mounted upon a rod 62 extending downward through the base 10 into the space below, and carrying at its lower end a short arm 63 whose free end is pivotally linked to one end of the member 60 by means of a link 64. I have shown the other yoke 32 carried by a sleeve 65 which embraces the rod 62 and extends downward to the space below the plate 10 in a similar manner, carrying at its lower end a short arm 66 whose free end is pivotally linked with the other end of the member 60 by means of a link 67.

The shaft 61 carries elements which are oscillatable therewith and are also pivotally mounted with respect thereto to rock in axial planes.

I have shown spaced transverse pins 68 and 69 carried by the shaft 61 at an angle to one another. Mounted on each pin is a collar 70 having an enlarged bore (indicated clearly by dotted lines in Fig. 3) to allow it to undergo a limited pivotal movement in vertical planes with respect to the shaft 61. Carried by the collars 70 are elements or arms 71 and 72 arranged at an angle horizontally to on another, as clearly seen in Fig. 2, and having projections or rollers 73 at their ends. The arms 71 and 72 are provided with rear extensions 74 and 75 respectively, of which the latter comprises a plate sector, clearly seen in Fig. 2. The extensions 74 and 75 are suitably connected so that pivotal movement of one arm will effect a similar movement of the other. I have shown a pin 76 carrying hemispherical collars 77 arranged with their curved surfaces contacting opposite sides of each rear extension. The arms 71 and 72 are disposed in superposed planes with the plane of the primary cam 41 therebetween. Pivotal movement of the arms 71 and 72 will bring either one thereof into a position whereby its projecting end 73 lies in the plane of the cam 41, while the other arm is withdrawn from said plane. When this pivotal movement is effected, at a given time, the rotating cam 41 will encounter the projection 73 which has been interposed into its path and will engage the projection through a portion of its rotation to swing the arms and oscillate the shaft 61. Once this swinging of the arms has been effected, the cam 41 will continue rotating in an inoperative manner until subsequent pivotal movement of the arms will interpose the other of said arms into the path of the cam.

It will be apparent therefore, that an oscillation of the member 60, and consequently an engagement of one clutch and a disengagement of the other clutch, will be effected only when the arms 71 and 72 are pivotally rocked. It is the function of the cam 45 to effect this pivotal rocking of the arms 71 and 72 at predetermined intervals of time. I have illustratively shown means operatively connecting the cam 45 with the arms 71 and 72, consisting of a lever 78 pivotally supported by a depending bracket 79 carried by the plate 10. The lever 78 comprises a main substantially straight body portion 80 and a shorter portion 81 at right angles thereto. The lever 78 is pivotally supported at a point substantially at the intersection of the portion 81 with the straight portion 80, and the ends of the lever are of different lengths, the shorter end having a length substantially the same as that of the portion 81. The short end of the lever and the portion 81 thereof carry projecting pins 82 and 83 respectively, adapted to be engaged by the cams 58 and 57 respectively. When the cam 45 is rotating in one direction, the cam element will engage the pin 83 to rock the lever in one direction, and when the cam 45 is rotating in the other direction, the cam element 58 will engage the pin 82 to rock the lever in the opposite direction. The short end of the lever is provided also with a projecting jaw 84 which slidably engages the plate sector 75 from above and below, whereby rocking of the lever 78 in one direction or the other will cause the arms 71 and 72 to rock accordingly in either one or the other direction.

Spring means are provided in association with the member 60 and with the lever 78 respectively to effect a sudden and positive movement of said member and lever after such movement has been initiated. I have shown the shaft 61 projecting upward and carrying at its upper end a transvere arm 85 having a pin 86 at its free end. I have shown a bracket 87 carried by the panel 12 and a lever 88 pivotally connected at one end thereof, as at 89, to the free end of the bracket 87. The free end of the lever 88 is connected by means of a spring 90 to the panel 12. When the lever 88 is positioned so that the spring 90 overlies the pivot point 89, a "dead center" condition obtains, but if the lever 88 is moved but slightly in either direction, the spring 90 will operate to draw the free end of the lever 88 to swing the lever about the point 89. At a point adjacent the pivot point 89, the lever 88 is provided with a slot which engages the pin 86. It will be apparent that when the arm 85 rotates it will move the lever 88 into and out of the "dead center" position, but immediately after the "dead center" position has been reached, the action of the spring 90 will tend to aid the movement of the arm 85. Consequently the oscillatable member 60 will be started in its movement by the cam 41, but will be brought suddenly and positively into a completion of its movement by the action of the spring 90.

A similar arrangement is shown as associated with the free end of the lever 78. A bracket 91 pivotally carries a member 92 at a point 93. The member 92 is attached at one end to the bracket 91 by a spring 94 and has a slot at the other end engaging a pin 95 carried by the lever 78. The "dead center" position will occur when the spring overlies the pivot point 93, but once the "dead center" position has been passed, the spring 94 will operate suddenly and positively to complete the oscillation of the lever 78.

The operation of the device will be apparent from the foregoing description of its component parts. Fig. 1 illustrates relative positions of the elements of the device at a time when the reel 16 is operative and has almost completed its winding operation. The cam element 57 will presently encounter the pin 83, whereupon the lever 78 will rock in a clock-wise direction, the spring 94 completing its movement. This rocking of the lever 78 will cause the jaw 84 to move downward, whereby the arms 71 and 72 will be rocked to bring the arm 72 up into the path of the constantly rotating cam 41. When this occurs, the cam 41 will encounter the arm 72, thereby oscillating the member 60. The spring 90 will operate to complete this oscillation in a positive and quick manner, whereby the clutch 30 will suddenly become disengaged and the clutch 25 engaged. Reel 15 will then have been rendered operative, and will re-wind the film 17. The reel 16, rotating in a reverse direction, will cause the cam 45 to rotate in the opposite direction, and at a predetermined time, depending upon the setting of the adjustable cam element 58 (depending in turn upon the length of the film 17), the element 58 will encounter the pin 82 and will rock the lever 78 in the opposite direction. This will bring the arm 71 into the path of the cam 41, and the oscillatable member 60 will be returned to its original position. This will cause the clutch 30 to become again engaged, and the clutch 25 to become disengaged, whereby forward movement of the film will be started anew.

It will be seen that the motor 33 rotates constantly in one direction, and that the reversal is effected entirely independent thereof. It will be evident further that only one adjustment is necessary, viz, an adjustment of the cam element 58. Once this element has been properly set, depending upon the length of the film being displayed, the action of the device and the reversing mechanism is entirely automatic, the operation continuing to wind and re-wind the film in successive intervals of time to display the film time after time, indefinitely.

The cam 41 as stated, is geared to rotate at a relatively rapid speed, the illustrated embodiment showing it arranged to rotate 100 times a minute at the normal rate of speed at which the film is moved. As a result of this arrangement regardless of the angular position of the cam 41 at the instant when one or the other of the roller 73 is moved into the path of rotation thereof, the cam will function immediately to move a roller and the lever arm 71 or 72 which carries it, to cause the clutches to be shifted and the drive reversed. In other words, while the time of operation of the timing mechanism may vary slightly, the operation of the actuating mechanism will be substantially instantaneous.

In Figs. 5, 6 and 7 of the drawing, I show another embodiment of the invention in which the timing mechanism is controlled by the thickness of the film section upon one or the other of the reels 15 and 16 instead of by the number of times that the reels have been rotated as in the above described embodiment, and upon viewing Figs. 5 and 6 of the drawing, it will be observed that a bar 100 is carried for an up and down sliding movement relatively to the machine frame and that this bar carries at its lower end the jaw 84' having a loose engagement with the extreme end of the lever 75 exactly in the same way as the jaw 84 engages the corresponding end of the lever 75 in Fig. 3 of the drawing.

Pivoted to the bar 100 at spaced points are the short levers 101 and 102 fixed to pins 103 and 104. The pins 103 and 104 are pivotally mounted on the machine frame and carry the spring arms 105 and 106, upon the outer free ends of which are mounted the rolls 107 and 108. Upon viewing Fig. 6 of the drawing, it will be observed that the spring arms 105 and 106 are bowed oppositely and are so arranged as to be positioned to contact with the extreme ends of the respective film portions upon the reels 15 and 16.

With the roller 107 of the upper spring arm 105 seated on the topmost portion of the film which is wound upon the reel 15 and assuming that the film is moved in one direction to wind it upon the reel 15, the film section thereon will increase in diameter, thus forcing the roller 107 upwardly thus swinging the pivot pin 103 and swinging the lever 101 upwardly to thus raise the bar 100. After the film on the reel 15 has reached a predetermined thickness, the bar 100 will have been raised to a point where the lower jaw of the jaw member 84' will contact with and raise the end of the lever 75 with which it engages to shift the rollers 73, one into and the other out of the plane of rotation of the cam 41.

In this upward movement of the bar 100, the lower lever 102 will also be rotated counterclockwise along with the pin 104 to move the roller 108 upwardly so as to maintain it in contact with the film portion on the lower reel 16. By making the parts 105 and 106 in the form of yieldable members, provision is made for the disproportionate increase in the thickness of one reel with reference to the decrease in thickness of the other reel. Furthermore, the rod 100 is held to its rectilinear up and down movement because of its manner of association with the pins 103 and 104 through the levers 101 and 102.

Conversely, when the direction of movement of the film is reversed and the film is being unwound from the reel 15 on to the reel 16 (as in Fig. 6), it will be the roller 108 which will be forced outwardly to lower the rod 100, thus lowering the jaw member 84' to give a reverse movement to the levers 74 and 75 to thus again reverse the direction of movement of the film.

Having thus described my invention and illustrated its use, what I claim as new and desire to secure by Letters Patent is:

1. In mechanism for winding and rewinding film reels, actuating means for reversing the direction of winding, said means comprising two members constantly moving at different rates of speed, one of which initiates said reversal and the other of which controls the time intervals of said initiation.

2. In mechanism for winding and rewinding film reels, actuating means for reversing the direction of winding, said means comprising two constantly rotating members, one of which initiates said reversal and the other of which controls the time intervals of said initiation.

3. In combination with film moving means, of means for reversing the direction of movement of the film, said means comprising constantly moving primary actuating means driven by said moving means for effectuating said reversal, and secondary actuating means cooperating with the first for controlling the timing of said effectuation.

4. In combination with mechanism for driving film reels, of means for reversing the direction of the reel drive, said means comprising constantly moving primary actuating means driven by said driving means for effectuating said reversal, and secondary actuating means driven by one of said reels and cooperating with the first for controlling the time intervals of said effectuation.

5. In mechanism for winding and rewinding film reels, control means for simultaneously rendering one of said reels operative and the other inoperative, and means for actuating said control means, said actuating means comprising a constantly moving member driven by the film moving means for directly actuating said control means, and a second constantly moving member driven by one of said reels for controlling the time intervals of said actuation.

6. In mechanism for winding and rewinding film reels, driving means, control means for simultaneously rendering one of said reels operative and the other inoperative, and means for actuating said control means, said actuating means comprising a constantly moving member driven rapidly by said driving means to impart kinetic energy thereto and for directly actuating the control means, and a second constantly moving member driven at a relatively lower rate of speed by one of said reels and cooperating with the first named member for predetermining the time intervals of said actuation.

7. In mechanism for winding and rewinding film reels, driving means, control means for simultaneously rendering one of said reels operative and the other inoperative, and means for actuating said control means, said actuating means comprising a constantly rotating member driven rapidly by said driving means to impart kinetic energy thereto and arranged and constructed to extend such energy to actuate said control means, and a second constantly rotating member driven at a relatively lower rate of speed by one of said reels and cooperating with the first named member for predetermining the time intervals of said actuation.

8. In mechanism for winding and rewinding film reels by driving means, actuating means for reversing the direction of winding, said means comprising a rotating cam driven by said driving means for controlling the reversal, and a second rotating cam driven by one of said reels and cooperating with the first named cam for controlling the time intervals of said reversal.

9. In mechanism for winding and rewinding film reels by driving means, actuating means for reversing the direction of winding, said means comprising a constantly rotating cam driven by said driving means for controlling said reversal and a second rotating cam driven by one of said reels at a relatively slower rate of speed and cooperating with the first named cam for controlling the time intervals of said reversal.

10. In mechanism for winding and rewinding film reels by driving means, actuating means for reversing the direction of winding, said means comprising a cam constantly rotated in one direction by said driving means for effectuating said reversal, and a second cam rotated through less than 360° at a relatively slower rate of speed by one of said reels and cooperating with the first named cam for controlling the time intervals of said effectuation.

11. In mechanism for winding and rewinding film reels, means for reversing the direction of winding, said means comprising a primary actuating cam for operating said reversal, and a secondary adjustable actuating cam cooperating with the first for controlling the time intervals of said operation.

12. In mechanism for winding and rewinding film reels by driving means, means for reversing the direction of winding, said means comprising a primary actuating cam constantly rotated in one direction by said driving means for reversing the direction of winding and a secondary adjustable actuating cam rotated at a relatively slower rate of speed by one of said reels and cooperation with the first for controlling the time intervals of said reversal.

13. In mechanism for winding and rewinding film reels, control means for simultaneously rendering one of said reels operative and the other inoperative, and means for actuating said control means, said actuating means comprising a constantly moving member, and elements carried by said control means and movable into and out of engagement with said member.

14. In mechanism for winding and rewinding film reels, control means for simultaneously rendering one of said reels operative and the other inoperative, and means for actuating said control means, said actuating means comprising a constantly rotating cam, and elements carried by said control means and movable into and out of engagement with said cam.

15. In mechanism for winding and rewinding film reels, control means for simultaneously rendering one of said reels operative and the other inoperative, and means for actuating said control means, said actuating means comprising a constantly rotating cam, elements carried by said control means and movable into and out of engagement with said cam, and means for moving said elements at predetermined intervals.

16. In mechanism for winding and rewinding film reels, control means for simultaneously rendering one of said reels operative and the other inoperative, and means for actuating said control means, said actuating means comprising primary actuating means for initiating said actuation, elements carried by said control means and movable into and out of cooperation with said primary means, and secondary actuating means for moving said elements at predetermined intervals.

17. In mechanism for winding and rewinding film reels by driving means, control means for simultaneously rendering one of said reels operative and the other inoperative, and means for actuating the control means, said actuating means comprising primary actuating means driven by said driving means for initiating said actuation, elements carried by said control means and movable into and out of cooperation with said primary means, and secondary actuating means driven by one of said reels for moving said elements at predetermined intervals.

18. In mechanism for winding and rewinding film reels by driving means, control means for simultaneously rendering one of said reels operative and the other inoperative, and means for actuating the control means, said actuating means comprising a constantly rotating cam driven by the driving means, elements carried by said control means and movable into and out of engagement with said cam, and a second rotating cam driven by one of said reels and cooperating with said elements to move them at predetermined intervals.

19. In mechanism for winding and rewinding film reels by driving means, control means for simultaneously rendering one of said reels operative and the other inoperative, and means for actuating the control means, said actuating means comprising a constantly rotating cam driven by the driving means, elements carried by said control means and movable into and out of engagement with said cam, and means for moving said elements at predetermined intervals comprising a constantly rotating cam driven by one of said reels, and means engaged by said last named cam and engaging said elements.

20. In mechanism for winding and rewinding film reels by driving means, control means for simultaneously rendering one of said reels operative and the other inoperative, and means for actuating the control means, said actuating means comprising a constantly rotating cam driven by the driving means, elements carried by said control means and movable into and out of engagement with said cam, and means for moving said elements at predetermined intervals comprising a constantly rotating cam driven by one of said reels, and means engaged by said last named cam and engaging said elements, said last named means comprising a lever provided with a jaw to engage said elements and provided with pins adapted to be engaged by said last named cam.

21. In mechanism for winding and rewinding film reels, control means for simultaneously rendering one of said reels operative and the other inoperative, and means comprising a constantly moving member for actuating the control means, said control means comprising a clutch associated with each reel, an oscillatable lever operatively connected at its ends with said clutches respectively, and elements movable with said lever and into and out of cooperation with said constantly moving member.

22. In mechanism for winding and rewinding film reels, control means for simultaneously rendering one of said reels operative and the other inoperative, and means for actuating the control means, said control means comprising a clutch associated with each reel, an oscillatable lever operatively connected at its ends with the clutches respectively, and two arms movable with the lever and movable alternately into cooperation with said actuating means.

23. In mechanism for winding and rewinding film reels, control means for simultaneously rendering one of said reels operative and the other inoperative, and means for actuating the control means, said control means comprising a clutch associated with each reel, an oscillatable lever operatively connected at opposite ends with the clutches respectively, a shaft for said lever, and two arms carried by said shaft at an angle to one another and movable alternately into cooperation with said actuating means.

24. In mechanism for winding and reminding film reels, control means for simultaneously rendering one of said reels operative and the other inoperative, and means for actuating the control means, said control means comprising a clutch associated with each reel, an oscillatable lever operatively connected at opposite ends with the clutches respectively, a shaft for said lever, and two arms pivotally carried by said shaft to rock in axial planes and disposed to cooperate alternately with said actuating means when rocked.

25. In mechanism for winding and rewinding film reels, control means for simultaneously rendering one of said reels operative and the other inoperative, and means for actuating the control means, said control means comprising a clutch associated with each reel, an oscillatable lever operatively connected at opposite ends with the clutches respectively, a shaft for said lever, two arms at an angle to one another pivotally carried by said shaft to rock in axial planes and disposed to cooperate alternately at one end with said actuating means when rocked, extensions carried by the rear ends of said arms, means connecting said extensions to permit said rocking, and means engaging one of said extensions to rock the latter at predetermined intervals.

26. In mechanism for winding and rewinding film reels, control means for simultaneously rendering one of said reels operative and the other inoperative, and means for actuating the control means, said control means comprising a clutch associated with each reel, an oscillatable lever operatively connected at opposite ends with the clutches respectively, a shaft for said lever, two arms carried by said shaft at an angle to one another to rotate with said shaft and pivotally carried by the shaft to permit said arms to rock in axial planes, said arms being disposed to cooperate alternately at one end with said actuating means when rocked, extensions carried by the rear ends of said arms, means connecting said extensions to cause rocking of one upon rocking of the other, and a jaw slidably engaging one of said extensions to rock the latter at predetermined intervals.

27. In mechanism for winding and rewinding film reels, control means for simultaneously rendering one of said reels operative and the other inoperative, and means for actuating the control means, said control means comprising a clutch associated with each reel, an oscillatable lever operatively connected at opposite ends with the clutches respectively, a shaft for said lever, spaced transverse pins carried by said shaft at an angle to one another, collars pivotally carried by said pins and having enlarged bores to permit pivotal movement thereof, two arms carried by said collars and having forward ends disposed to cooperate alternately with said actuating means when said collars are rocked, extensions carried by the rear ends of said arms, means connecting said extensions to cause rocking of one upon rocking of the other, one of said extensions comprising a plate sector, and a jaw slidably engaging said sector to rock said arms at predetermined intervals.

28. In a film winding mechanism comprising two reels, in combination, means for reversing the diretcion of winding, said means comprising a control member capable of oscillatory movement between two positions and operatively connected with said reels for rendering one thereof operative and the other inoperative in either of said positions, and means for oscillating said member at predetermined intervals, said last named means comprising a constantly moving member, elements operatively connected with said oscillatory member and movable into and out of engagement with said moving member, and means movable in timed relation to the film winding mechanism for moving one of said elements into engagement.

29. In mechanism comprising two clutches, means for simultaneously engaging one and disengaging the other thereof, said means comprising controlling mechanism capable of oscillatory movement between two positions and operatively connected with said clutches, normally inoperative primary actuating means comprising a constantly rotating member arranged and constructed to cooperate with said mechanism for initiating said oscillatory movement, and secondary actuating means for rendering the last named means operative at predetermined intervals.

30. In a reel winding device of the character described, reversing mechanism of the character described, comprising driving means, constantly moving primary actuating means driven thereby, oscillatable mechanism including elements movable alternately into cooperation with said primary means, and secondary actuating means for moving said elements at predetermined intervals.

31. In a reel winding device of the character described, reversing mechanism, comprising driving means, constantly moving primary actuating means driven thereby, an oscillatable member, two movable elements operatively connected with said member and movable alternately into engageable positions with respect to said primary means, and secondary actuating means for moving said elements at predetermined intervals.

32. In a reel winding device of the character described, reversing mechanism comprising driving means, a constantly rotating cam driven thereby, oscillatable mechanism including elements movable alternately into engagement with said cam, and means for moving said elements at predetermined intervals.

33. In a reel winding device of the character described, reversing mechanism, comprising driving means, a constantly rotating cam driven thereby, oscillatable mechanism including two elements movable alternately into engagement with said cam, and a second rotating cam adapted to cooperate with said elements to move them at predetermined intervals.

34. In a reel winding device of the character described, reversing mechanism comprising driving means, a contantly rotating cam driven thereby, oscillatable mechanism including two elements movable alternately into engagement with said cam, and a second cam rotating at a relatively slower rate of speed and adapted to cooperate with said elements to move them at predetermined intervals.

35. In a reel winding device of the character described, reversing mechanism comprising driving means, a constantly rotating cam driven thereby, an oscillatable lever, control means comprising two movable arms operatively connected with the lever and movable alternately into engagement with said cam, and means for moving the control means at predetermined intervals to engage alternate arms to oscillate the lever.

36. In a reel winding device of the character described, reversing mechanism comprising two rotatable spindles, two oppositely rotating shafts, clutch means between said spindles and shafts respectively, oscillatable means for simultaneously engaging one and disengaging the other of said clutch means, a constantly rotating cam, control means operatively connected with said oscillatable means and movable into and out of engagement with said cam, and means for moving said control means at predetermined intervals to be engaged by the cam to operate said oscillatable means.

37. In a film reel device of the character described, means for reversing the direction of movement of the film, including constantly driven members, one of which is continuously rotated in the same direction and the other of which is a cam movable synchronously with a reel and which therefore reverses its movement with the reversal of the film movement.

38. In a film reel device of the character described, means for reversing the direction of movement of the film, said means comprising a rapidly rotating member for effectuating the reversal, and a slowly moving member for predetermining the timing at which such reversal shall be effectuated, said last mentioned member comprising a cam movable synchronously with a reel so as to reverse its movement with the reversal of the film movement.

In witness whereof, I have hereunto signed my name.

BARTON A. PROCTOR.